(12) United States Patent  (10) Patent No.: US 7,203,713 B2
Faiman et al.  (45) Date of Patent: Apr. 10, 2007

(54) METHOD AND APPARATUS FOR OPTIMIZING EXTENT SIZE

(75) Inventors: Nathan Glenn Faiman, Rochester, MN (US); Michael L. Nordstrom, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 10/251,540

(22) Filed: Sep. 20, 2002

(65) Prior Publication Data

US 2004/0059758 A1   Mar. 25, 2004

(51) Int. Cl.
    *G06F 17/30*  (2006.01)

(52) U.S. Cl. ..................................... 707/205

(58) Field of Classification Search .................. 707/1, 707/2, 3, 10, 200, 205; 709/235, 224; 370/254; 386/125
See application file for complete search history.

(56) References Cited

U.S. PATENT DOCUMENTS

| 5,323,161 A | * | 6/1994 | Gailer et al. ................... 342/13 |
| 5,987,479 A | | 11/1999 | Oliver ......................... 707/205 |
| 6,085,254 A | * | 7/2000 | Kotsinas et al. ............. 709/235 |
| 2002/0196744 A1 | * | 12/2002 | O'Connor ................... 370/254 |
| 2003/0177144 A1 | * | 9/2003 | Hover ......................... 707/200 |
| 2003/0228141 A1 | * | 12/2003 | Ballantyne ................... 386/125 |
| 2004/0049478 A1 | * | 3/2004 | Jasper et al. ................... 707/1 |

* cited by examiner

*Primary Examiner*—Etienne P. LeRoux
(74) *Attorney, Agent, or Firm*—Grant A. Johnson

(57) ABSTRACT

The present invention optimizes storage of stream file by dynamically adjusting the size of new extents. In one embodiment, a file system manager collects usage statistics for a plurality of files in a file system. The file system manager uses the usage statistics to create larger extents for frequently used files than for infrequently used files.

11 Claims, 3 Drawing Sheets

METHOD AND APPARATUS FOR OPTIMIZING EXTENT SIZE

TECHNICAL FIELD

This invention relates to the field of computer operating systems, and more particularly to extent size allocation for disk-based file systems.

BACKGROUND

The development of the EDVAC computer system of 1948 is often cited as the beginning of the computer era. Since that time, computer systems have evolved into extremely complicated devices. To be sure, today's computers are more sophisticated than early systems such as the EDVAC. Fundamentally speaking, though, the most basic requirements levied upon computer systems have not changed. Now, as in the past, a computer system's job is to access, manipulate, and store information. This fact is true regardless of the type or vintage of computer system.

A typical computer system stores as a series of magnetic transitions on magnetic medium, such as a direct access storage device ("DASD"). The physical location of, and the relationship between, these magnetic transitions are governed by set of rules called a file system. Most file systems divide the magnetic media into a large number of sectors. When the computer system wants to store a new file on the DASD device, the DASD's file system manager program will assign a group of sectors to store the data. Most file systems also allocate a few extra sectors at this time so that the computer can add data to the file in the future.

If the file grows too large to be stored by the original allocation of sectors, the file system manager will allocate additional sectors (also known as an "extent") to extend the file, and then logically link the original sectors to the new extent. Although this process is desirable because it allows the file system to store arbitrarily large files, the process of creating an extent requires more computer resources than does the process of merely adding additional data to an existing allocation of sectors. That is, each time the computer fills up an existing allocation and must create an extent, it slows down. The extra time required can, in turn, create a bottleneck because no processor can run at maximum efficiency if that processor is incapable of quickly obtaining the data upon which it is operating. This problem is a particular concern in high performance computers, such as servers, mainframe computers, midrange computers, because they typically need to access significant amounts of data.

One partial solution to these problems is to allocate a large number of sectors to the original file and any extents, thereby minimizing the number of times that the file manager has to create a new extent. One drawback to this method, however, is that it wastes significant amount of disk space, which hurts the drive manufacturer's price-to-performance ratio.

These problems have become an increasing concern with the increasing of stream files. These files generally comprise a continuous stream of bits, such as files and documents, stored in folders, and are desirable because they are well suited for storing large blocks of data, such as the text of a document, images, audio, and video. Unfortunately, the ultimate size of these files is difficult for file system manager to predict.

Accordingly, there is a need for an improved method of allocating storage to data files, particularly stream files.

SUMMARY OF THE INVENTION

The present invention optimizes storage of stream file by dynamically adjusting the size of new extents. In one embodiment, a file system manager collects usage statistics for a plurality of files in a file system. The system manager creates larger extents for frequently used files than it does for infrequently used files.

Accordingly, one aspect of the present invention is a method for optimizing a file system comprising computing an usage frequency for a file, and creating an extent having a size related to the usage frequency. In one embodiment, computing the operation frequency comprises counting a number of operations performed on the file (such as a number of read operations, a number of write operations, and a number of truncate operations) and comparing the usage frequency for the file to an average usage frequency. In some embodiments, the extent comprises a data portion and an empty portion, and wherein the ratio between the empty portion and the data portion is larger for files in which a usage frequency greater than the mean usage frequency than for files in which the usage frequency is smaller than the mean usage frequency.

Another aspect of the present invention is a computer system comprising a storage device for storing data, such as a hard disk drive, and a file system manager operatively coupled to the storage device. The file system manager in one embodiment is adapted to create an extent for the data having a size related to a usage frequency for the file. In some embodiments, the hard disk drive comprises a plurality of sectors, and wherein the extent comprises at least one segment for current data and at least one segment for expansion data. Yet another aspect of the present invention is a computer program product comprising a program configured to perform a method for optimizing a file system, and a signal bearing media bearing the program. The method in one embodiment comprises computing a usage frequency for a file, and creating an extent having a size related to the usage frequency. In some embodiments, the method further comprises calculated a mean usage frequency for the file system, and comparing the usage frequency for the file to the usage frequency for the file system.

One advantage of the present invention is that it reduces the computing resource load associated with creating new extents by allocating a large number of sectors to extents for frequently used files. Another advantage of the present invention is that it reduces unused space on the hard disk or in memory by allocating a small number of sectors to extents associated with infrequently used files. These and other features and advantages of this invention will become apparent from the following detailed description of the presently preferred embodiment of the invention, taken in conjunction with the accompanying drawings.

DETAILED DESCRIPTION

Figure 1:
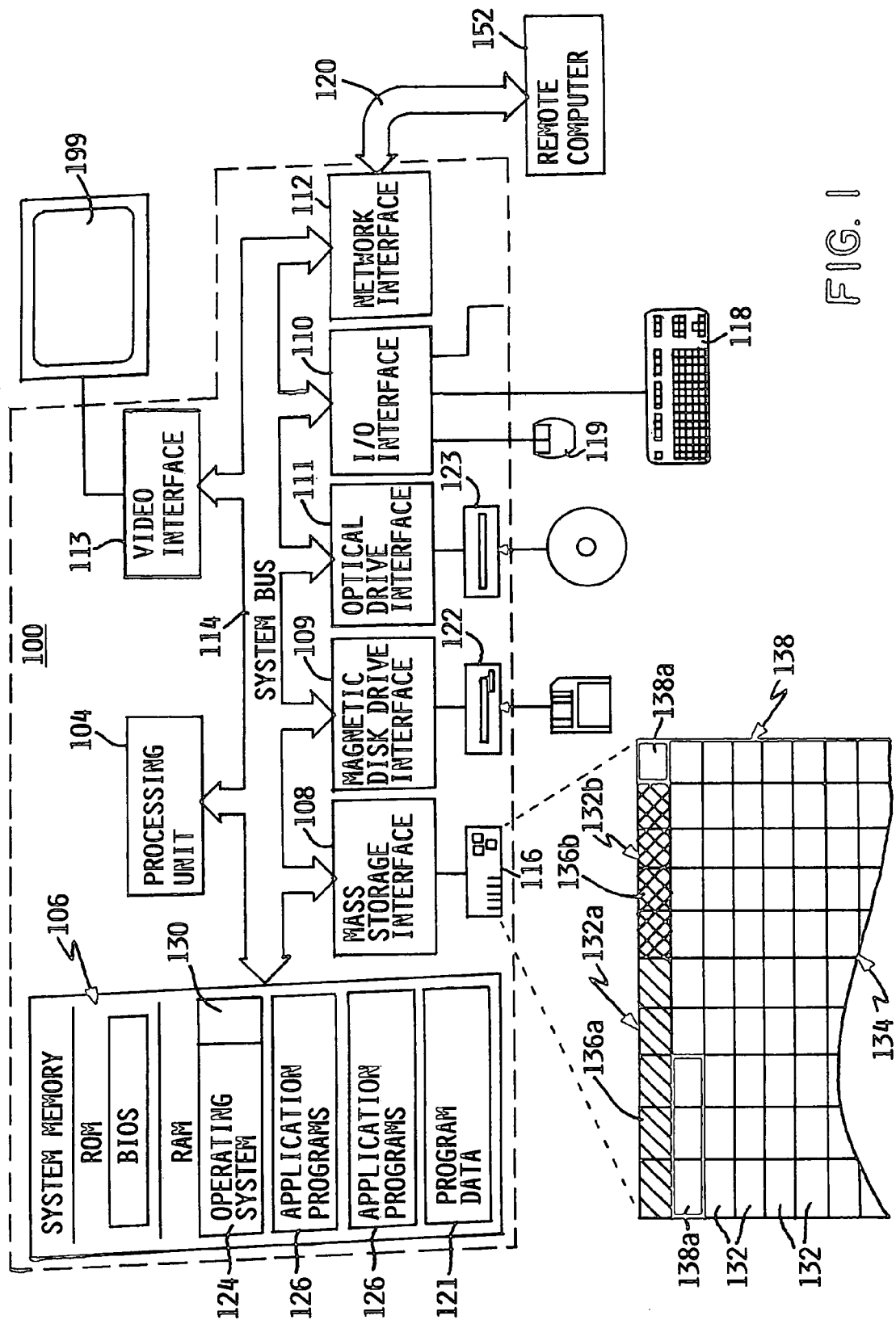
FIG. 1 is a block diagram of a computer system embodiment.

FIG. 1 depicts a computer system 100 embodiment having a processor 104 connected to a memory 106, a mass storage interface 108, a magnetic disk drive interface 109, an I/O interface 110, an optical drive interface 111, a network interface 112, and a video interface 113 via a system bus 114. The mass storage interface 108 connects one or more direct access storage devices ("DASD") 116, such as a hard disk drive, to the system bus 114. The input/output ("I/O") interface 110 connects a plurality of input/output devices, such as a keyboard 118 and mouse 119, to the system bus 114. The network interface 112 connects the computer 100 to a plurality of other computers 152 over an appropriate communication medium 120, such as the Internet. The magnetic disk drive interface 109 and the optical disk drive interface 111 connect to a removable magnetic disk ("floppy") drive 122 and an optical disk drive 123, respectively. The memory 106 contains data 121, one or more application programs 126, and an operating system 124. The operating system 124 contains a file system manager 130 that organizes a plurality of disk sectors 132 in the DASD device 116 into a file system 134. As illustrated, the file system manager 130 has initially allocated a first group of sectors 132a to store a first stream file 136a and a second group of sectors 132b to store a second stream file 136b. The file system 134 also contains a plurality of empty sectors 138.

Figure 2A:
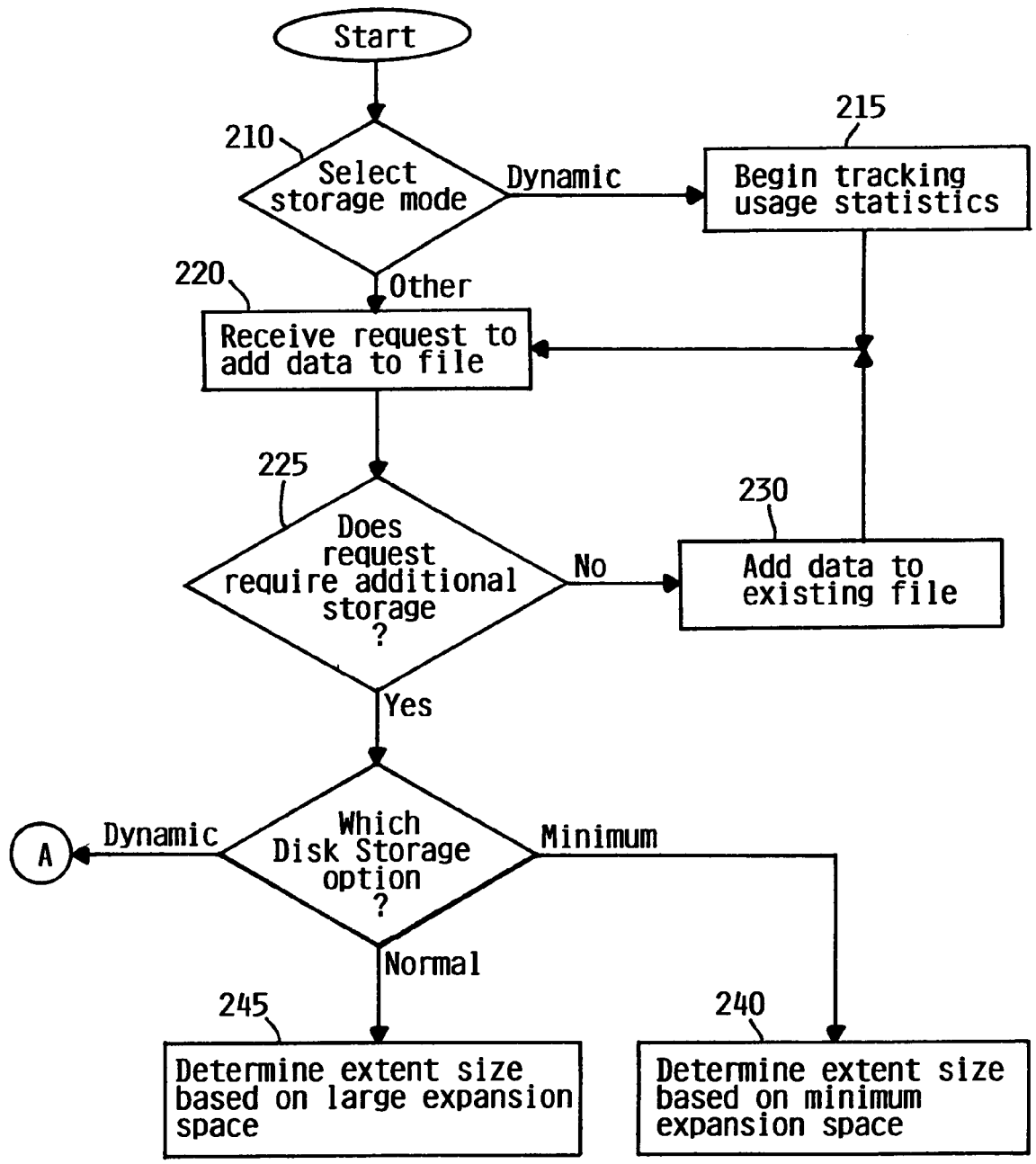
FIGS. 2A–2B depict the computer system in FIG. 1 in operation.
Figure 2B:
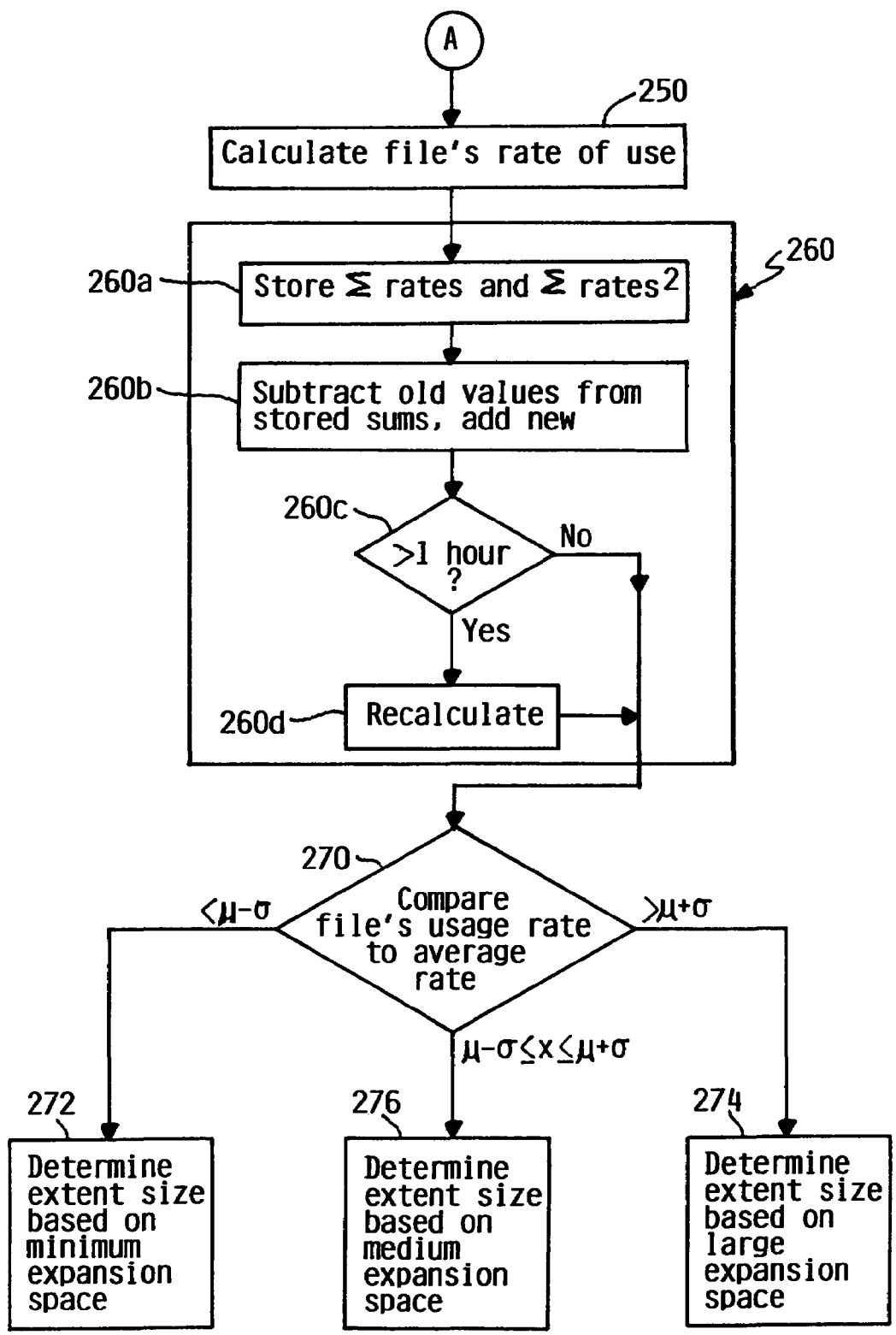

FIGS. 2A–2B depict the process executed by the computer system 100. At block 210, the administrator of the computer system 100 selects a disk storage option for the first stream file 136a. In this embodiment, the administrator can select between a normal allocation mode, a minimum allocation mode, and a dynamic allocation mode. If the system administrator selected dynamic allocation mode, the file system manager 130 will begin to track usage statistics for the file 136a at block 215. The usage statistics in this embodiment include the number of operations performed on the file (e.g., writes, reads, and truncates) and the date on which the administrator selected dynamic allocation mode for the file 136a. However, other usage indicators and statistics, such as individually tracking writes, reads, and truncates, are within the scope of the present invention.

At block 220, the operating system 124 sends a request to the file system manager 130 to add additional data 121 to the first stream file 136a. In response, the file system manager 130 determines if there is additional space remaining in the first group of sectors 132a at block 225. If there is sufficient space to store the new data 121 in first group of sectors 132a, the file system manager 130 simply adds the additional data 121 to the first group of sectors 132a at block 230, and then waits for the next request from the operating system 124. If the first group of sectors 132a is not large enough to contain the new data 121, the file system creates an extent 138a for the data from the plurality of empty sectors 138. That is, the file system manager 130 will allocate a group of empty sectors 138 for an extent 138a to store the new data 121, and then will logically link the extent 138a to the first group of sectors 132a so that the DASD device 116 will return both groups of sectors (i.e., 132a and 138a) in response to a request for the first stream file 136a.

The number of sectors in the extent 138a (i.e., its size) will vary depending on the operation mode selected at block 210. If the system administrator selected minimum allocation mode, the file system manager 130 will allocate just enough sectors to the extent 138a to contain the new data 121 at block 240. If the system administrator selected normal allocation mode, the file system manager will allocate enough sectors to the extent 138a sufficient to hold the new data 121 plus a large amount of expansion space (e.g., approximately 100% of the stream file's 136a size until a maximum extent size is reached) at block 245. If the system administrator selected the dynamic allocation mode, the file system manager 130 will proceed to block 250.

At block 250 in FIG. 2B, the file system manager 130 calculates the first stream file's 136a rate of use from the file's usage statistics (e.g., by dividing the operation count collected at block 215 by the difference between the current system time and the time the file manager 130 began collecting usage statistics for the stream file 136a). At block 260, the file system manager 130 computes the mean ("$\mu$") and standard deviation ("$\sigma$") of the usage rate for all of the files in the file system 134 selected for dynamic allocation mode. One suitable method is to store the sum of all the rates (calculated at block 250), and the sum of the rates squared, at block 260a. Each time a new rate is calculated at block 250, the file system will subtract the old rate for the file 136a and the square of the old rate from the stored values, then add the new rate and rate squared to the stored values, at block 260b. The file system manager can then periodically (e.g., once an hour) recalculate the mean usage rate and the standard deviation of the usage rate using well-known statistical formulas at blocks 260c–260d. At block 270, the file system manager 130 compares the usage rate of the first stream file 136a to the mean usage for the file system 134. If the first stream file's 136a usage rate is more than one standard deviation under the mean, the file system manager 130 allocates enough sectors to the extent 138a to contain the new data 121 plus space for a minimum amount of additional data at block 272 (e.g., between about 5% and 29% of the stream file's 136a size until a maximum extent size is reached). If the first stream file's 136a usage rate is more than one standard deviation over the mean, the file system manager 130 allocates enough sectors to the extent 138a to contain the new data 121 plus space for a large amount of additional data (e.g., between about 5% and 400% percent of the stream file's 136a size until a maximum extent size is reached). If the first stream file's 136a usage rate is within one standard deviation of the mean, the file system manager 130 allocates enough sectors to the extent 138a to contain the new data 121 plus space for a medium amount of additional data (e.g., between about 5% and 75% of the stream file's 136a size until a maximum extent size is reached). The exact amount of extra space used for these three options will vary depending on the requested size of the extent and the particular requirements of the computer 100.

Referring again to FIG. 1, the main memory 120 in this embodiment contains program data 121, an operating system 124, and one or more application programs 126. The program data 121 represents any data that serves as input to or output from any program in computer system 100. The software applications 126 comprise a detailed set of instructions that describe how the computer 100 is to access, manipulate, and store the program data 121. The operating system 124 is a sophisticated program that manages the resources of the computer system 100. These resources include the processor 104, the main memory 106, the mass storage interface 108, the network interface 112, the display interface 113, and system bus 114.

The computer system 100 in this embodiment utilizes well-known virtual addressing mechanisms that allow the programs of computer system 100 to behave as if they only have access to a large, single storage entity instead of access to multiple, smaller storage entities such as main memory 106 and DASD device 116. Therefore, while the program data 121, the operating system 124, and the application software 126 are shown to reside in main memory 106, and the files 136 and extents 138 shown to exist on the DASD device 116, those skilled in the art will recognize that any of items may reside in one or both of the main memory 106 and the DASD device 116 at any given time, and the present invention will still apply.

The processor 104 may be constructed from one or more microprocessors and/or integrated circuits. Processor 104 executes program instructions stored in main memory 106. Main memory 106 stores programs and data that processor 104 may access. It may be comprised a variety of memory types, such as random access memory ("RAM") and read only memory ("ROM"), and may be organized into a hierarchy of elements, such as a main store and a cache. Although the computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 104. However, those skilled in the art will appreciate that the present invention applies equally to computer systems that simply use I/O adapters to perform similar functions.

The display interface 113 is used to directly connect one or more displays 199 to computer system 100. These displays, which may be non-intelligent (i.e., dumb) terminals or fully programmable workstations, are used to allow system administrators and users to communicate with computer system 100. Note, however, that while the display interface 113 is provided to support communication with the one or more displays, the computer system 100 does not necessarily require a display, because all needed interaction with users and other processes may occur via network interface 112.

The network interface 112 is used to connect the computer system 100 other computer systems and/or workstations 152 across a network 120. The present invention applies equally no matter how computer system 100 may be connected to other computer systems and/or workstations, regardless of whether the network connection is made using present-day analog and/or digital techniques or via some networking mechanism of the future. In addition, many different network protocols can be used to implement a network. These protocols are specialized computer programs that allow computers to communicate across network 120. TCP/IP (Transmission Control Protocol/Internet Protocol) is an example of a suitable network protocol.

One suitable computer system 100 is an eServer iSeries® computer running the OS/400® multitasking operating system, both of which are produced by International Business Machines Corporation of Armonk, N.Y. However, those skilled in the art will appreciate that the mechanisms and apparatus of the present invention apply equally to any computer system and operating system, regardless of whether the computer system is a complicated multi-user, multi-threaded system, a single processor workstation, or an embedded control system.

Although the present invention has been described in detail with reference to certain examples thereof, it may be also embodied in other specific forms without departing from the essential spirit or attributes thereof. For example, the present invention is capable of being distributed as a program product in a variety of forms, and applies equally regardless of the particular type of signal bearing media used to actually carry out the distribution. Examples of suitable signal bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive, a CD-R disk, a CD-RW disk, or hard-disk drive); or (iii) information conveyed to a computer by a communications medium, such as through a computer or telephone network, including wireless communications, and specifically includes information downloaded from the Internet and other networks. Such signal-bearing media, when carrying computer-readable instructions that direct the functions of the present invention, represent embodiments of the present invention.

Those skilled in the art will also appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Therefore, it is desired that the embodiments described herein be considered in all respects as illustrative, not restrictive, and that reference be made to the appended claims for determining the scope of the invention.

The invention claimed is:

1. A method for optimizing a file system, comprising:
   computing an usage frequency for a file;
   calculating a mean usage frequency for a plurality of files selected for dynamic allocation; and
   creating an extent having a size related to a difference between the usage frequency for the file and the mean usage frequency.

2. The method of claim 1, wherein computing the usage frequency comprises counting a number of operations performed on the file.

3. The method of claim 2, wherein the operations are selected from a group consisting of a number of read operations, a number of write operations, and a number of truncate operations.

4. The method of claim 1, wherein the extent comprises a data portion and an empty portion, and wherein the ratio between the empty portion and the data portion is larger for files in which a usage frequency greater than the mean usage frequency than for files in which the usage frequency is smaller than the mean usage frequency.

5. The method of claim 1, wherein computing the usage frequency comprises counting a number of operations performed on the file over a predetermined period of time.

6. A method for implementing method for optimizing a file system, comprising configuring a computer system to perform the method of claim 1.

7. A computer system comprising:
   a storage device for storing data; and
   a file system manager operatively coupled to the storage device, wherein the file system manager is adapted to create an extent for the data having a size related to a usage frequency for the file and an average usage frequency for a plurality of files selected for dynamic allocation.

8. The computer system of claim 7, wherein the storage device comprises a hard disk drive.

9. The computer system of claim 8, wherein the hard disk drive comprises a plurality of sectors, and wherein the extent comprises at least one segment for current data and at least one segment for expansion data.

10. The computer system of claim 8, wherein the extent comprises a data portion and an empty portion, and wherein the ratio between the empty portion and the data portion is larger for files in which a usage frequency greater than the mean usage frequency than for files in which the usage frequency is smaller than the mean usage frequency.

11. The computer system of claim 7, wherein the file system manager is further adapted to identify the plurality of files selected for dynamic allocation, a plurality of files selected for minimum allocation mode, and a plurality of files selected for normal allocation mode.

* * * * *